United States Patent [19]

Nathan et al.

[11] Patent Number: 4,847,540
[45] Date of Patent: Jul. 11, 1989

[54] CIRCUIT FOR CONTROLLING THE SWITCHING OF A MOTOR AND APPLICATION TO THE VARIATION OF SPEED OF THE CONTROL CIRCUIT

[75] Inventors: Guy Nathan, Vanves; Bernard Vicaine, Paris, both of France

[73] Assignee: Societe Nationale Elf Aquitaine, Courbevoie, France

[21] Appl. No.: 131,394

[22] PCT Filed: Mar. 20, 1987

[86] PCT No.: PCT/FR87/00087
§ 371 Date: Dec. 7, 1987
§ 102(e) Date: Dec. 7, 1987

[87] PCT Pub. No.: WO87/05757
PCT Pub. Date: Sep. 24, 1987

[30] Foreign Application Priority Data
Mar. 21, 1986 [FR] France .................. 86 04099

[51] Int. Cl.⁴ ........................................ H02K 29/12
[52] U.S. Cl. ........................... 318/254; 318/138
[58] Field of Search .................. 318/138, 254, 439

[56] References Cited

U.S. PATENT DOCUMENTS

| | | | |
|---|---|---|---|
| 3,134,220 | 5/1964 | Meisner | 318/254 X |
| 3,153,185 | 10/1964 | Hummel | |
| 3,419,782 | 12/1968 | Sheldrake et al. | |
| 3,501,664 | 3/1970 | Veillette | 318/254 |
| 3,585,474 | 6/1971 | Kobayashi | 318/138 X |
| 3,590,353 | 6/1971 | Kobayashi | 318/254 |
| 3,594,624 | 7/1971 | Lueder | 318/254 |
| 3,683,248 | 8/1972 | Kobayashi et al. | 318/254 X |
| 3,769,555 | 10/1973 | Dolbachian et al. | |
| 3,848,166 | 11/1974 | Jamieson | |
| 3,911,338 | 10/1975 | Igarashi et al. | 318/254 X |
| 4,004,202 | 1/1977 | Davis | 318/254 X |
| 4,008,422 | 2/1977 | Sodekoda et al. | 318/254 X |
| 4,035,699 | 7/1977 | Schade | |
| 4,338,551 | 7/1982 | Mizumoto | |
| 4,359,674 | 11/1982 | Gotou | 318/341 X |

Primary Examiner—Bentsu Ro
Attorney, Agent, or Firm—Oblon, Spivak, McClelland, Maier & Neustadt

[57] ABSTRACT

The disclosed control circuit for switching a brushless direct current motor comprises and energizer element (95) rotationally integral with the rotating element of the motor, said energizer element cooperating with fixed sensors (C1), (C2), (C3), in equal number to the number of motor windings (90),(91),(92) evenly distributed about the motor shaft on the periphery of the fixed element of the motor, so that the energizer element (95) passes successively close to each sensor and, as a result, the sensor in question passes from a normal condition of high impedance to a condition of low impedance. Said circuit is characterized in that the energizer element covers an angular sector close to that which defines the successive spacing of two sensors (C1), (C2), (C3), and in that each sensor (C1), (C2), (C3) is mounted in a circuit comprising in series a single oscillator (6) and the primary winding (100),(200),(300) of a transformer (N1),(N2),(N3), associated with each sensor, said respective transformer (N1) comprising at least one secondary winding (101) of which one of the terminals is connected through a single alternation rectifier circuit (1010) and a filter circuit (1011), (1012) to the control input of a static switch (T1), providing for the transmission of the supply voltage (VM) to the winding (90) of the motor.

9 Claims, 3 Drawing Sheets

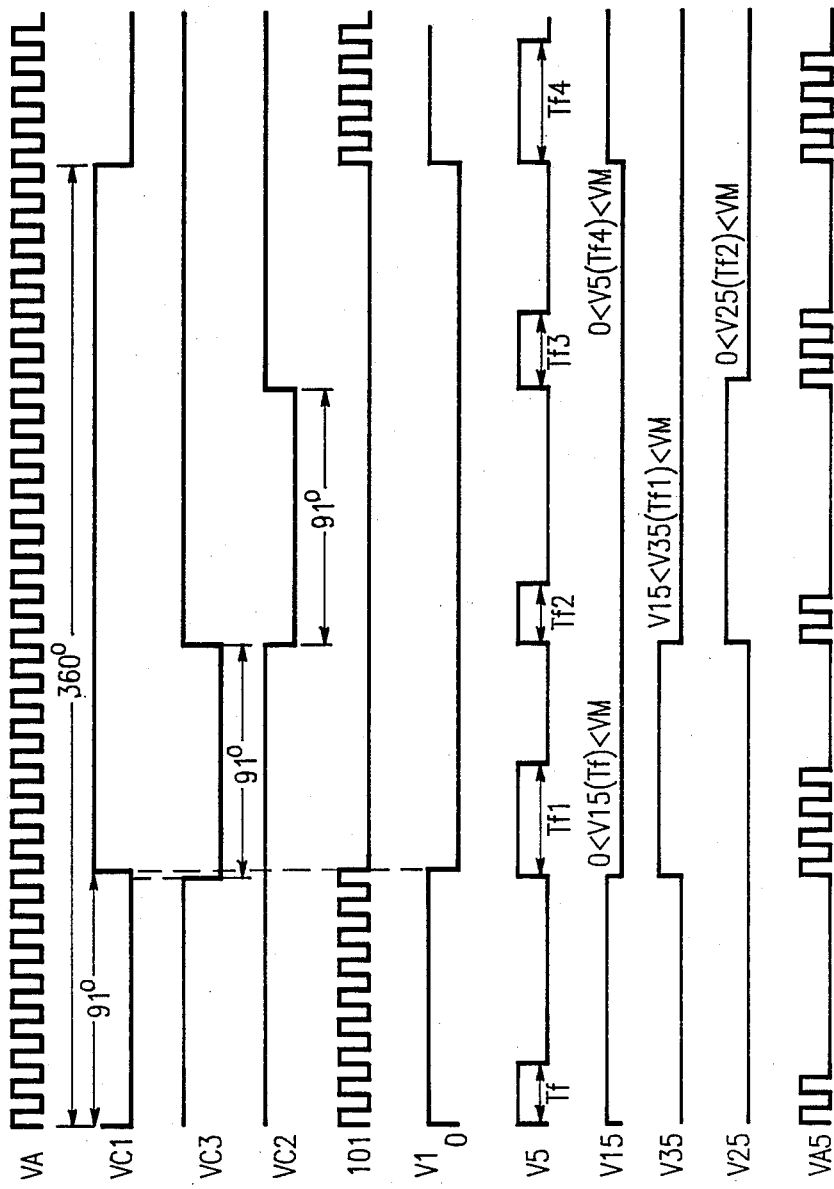

4,847,540

CIRCUIT FOR CONTROLLING THE SWITCHING OF A MOTOR AND APPLICATION TO THE VARIATION OF SPEED OF THE CONTROL CIRCUIT

BACKGROUND OF THE INVENTION

1. Field of the Invention

This invention relates to a circuit for controlling the switching of the power supply of a motor and its application to the variation of speed.

2. Discussion of the Background

Switching circuits for a motor are known, particularly for a direct current, brushless motor. An example of these switching circuits is constituted by U.S. Pat. No. 3,364,407, which describes a switching circuit for supplying a direct current, brushless motor, comprising a six-point output series winding. This switching circuit is controlled by Hall-effect sensors. Generally, this type of circuit comprises a certain number of semiconductors assuring the switching of the power and other semiconductors which assure the control of the switching elements. Moreover, these types of circuits comprise a certain number of resistive elements necessary for the good operation of the electronics, which gives rise to losses by Joule effect and a dissipation, in the form of heat, of the power supplied. Finally, in the example of embodiment proposed in this U.S. patent and in the prior art in general, there is no galvanic decoupling between the switching elements of the power and the elements which assure the control of the switching elements.

SUMMARY OF THE INVENTION

Consequently, a first object of the invention is to mitigate the drawbacks of the prior art and to propose a switching circuit for the power supply of motors which exhibit a galvanic insulation between the control signals and the switching elements of the power and comprising, at the same time the fewest elements possible, in particular, the fewest elements giving rise to power losses by dissipation by Joule effect, to improve efficiency.

This first objective is attained by the fact that the circuit for controlling the switching of a brushless, direct current motor comprises an exciting element solid in rotation with the rotating element of the motor, this exciting element working with stationary sensors equal in number to the number of windings of the motor and regularly distributed around the motor shaft on the periphery of the stationary element of the motor and placed according to determined angular sectors, so that the exciting elements passes successively in the immediate proximity of each of the sensors, these sensors normally being in a state of high impedance and passing to a state of low impedance when the exciting element, in its rotation movement, passes in immediate proximity of the sensor, and is characterized in that the exciting element covers an angular sector near the angular sector defining the successive space of two sensors, each sensor is mounted in a circuit comprising, in series, a single oscillator and the primary winding of a transformer associated with each sensor, said respective transformer comprising at least one secondary winding, one of the terminals is connected, by a half-wave rectifier circuit and a filtering circuit, at the control input of a static switch assuring the transmission of the supply voltage to the winding of the motor.

A second object is to make possible the use of this circuit with a star winding motor.

This second object is attained by the fact that the winding of the motor is a star and by the fact that the exciting element covers an angular sector slightly greater than 120 degrees, so as to be able to excite simultaneously two of the three sensors associated with the three-point star winding.

A third object is to make possible the use of the circuit with a motor having a symmetric winding.

This third object is attained by the fact that each transformer, associated with a sensor, comprises two secondary windings whose outputs are connected, by a half-wave rectifier circuit and a filtering circuit at, respectively, a first static switch connecting a half of the symmetric winding of the motor to the positive polarity of the power supply source and a second static switch connecting the other half of the winding to the negative polarity of the power supply source of the motor.

Another object of the invention is to make possible the use of the circuit for a symmetrical series winding having four output points.

This object is attained by the fact that the exciting element covers an angular sector slightly greater than 90 degrees, so as to be able to excite, simultaneously, in certain angular positions, two of the four sensors associated with each of the outputs of the four-point winding.

Another object of the invention is to have a capability of the circuit for the use of components of various technologies, such as MOS transistors and bipolar transistors, that will be used as a function of the powers to be transmitted to the motor.

This object is attained by the fact that the static switch consists of a MOS transistor and the transformer has a transformation ratio equal to 1.

According to another characteristic, this object is also attained by the fact that the static switch consists of a bipolar transistor and the transformer has a transformation ratio equal to 1/n.

Another object of the invention is to apply the circuit to controlling starting or stopping of the motor.

This object is attained by the fact that the operation of the oscillatory circuit can be inhibited by a switch whose open position controls the stopping of the motor and whose closed position the starting.

A final object of the invention is to make possible an application to the speed variation of this circuit.

The latter object is attained by the fact that the operation of the oscillatory circuit is inhibited by a static switch whose closure time is determined by an electronic circuit controlled as a function of the rotation speed of the motor.

BRIEF DESCRIPTION OF THE DRAWINGS

Other characteristics and advantages of this invention will come out more clearly on reading the following description made with reference to the accompanying drawings in which:

FIG. 3 represents a time diagram of the signals transmitted by the circuit of FIG. 1;

DESCRIPTION OF THE PREFERRED EMBODIMENTS

Figure 1:
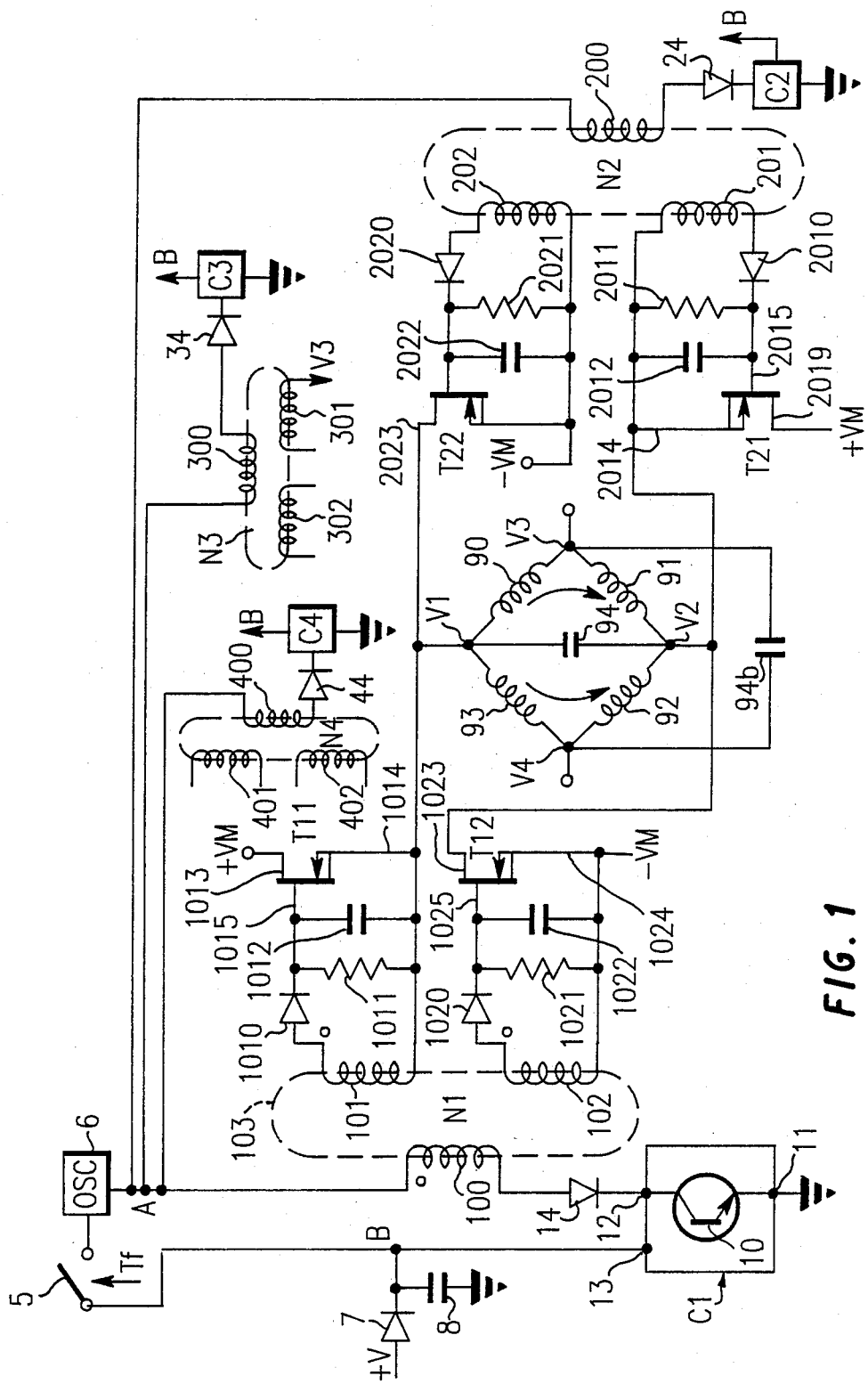
FIG. 1 represents the diagram of the electronic switching circuit applied to a series winding motor with four output points.

FIG. 1 represents a motor whose winding of the stator consists of four coils 90 to 93, mounted in series along a polygonal contour comprising four output points V1, V2, V3, V4. Output V1 is connected, on the one hand, to source 1014 of a MOS transistor constituting a static switch T11. Drain 1013 of this MOS transistor is connected to the positive polarity of the supply voltage VM of the motor. The point common to source 1014 and to terminal V1 is also connected to one of the output terminals of a secondary winding 101. This secondary winding 101 belongs to a transformer N1 which, by way of example, can have a toric core 103. The second terminal of secondary winding 101 is connected to control input 1015 of static switch T11, constituted by the MOS transistor by a rectifier diode 1010 and a filtering circuit constituted by a resistor 1011 and a capacitor 1012 connected in parallel to the terminals of diode 1010 and of secondary winding 101. Transformer N1 comprises a primary winding 100 and a second secondary winding 102. As can be seen in FIG. 1, the directions of the windings are identical. Output terminal V2, belonging to the opposite vertex of the polygon consisting of windings 90 to 93, is connected at output 1023 of static switch T12 which consists of the drain of the MOS transistor. Control input 1025 of static switch T12 is connected to second secondary winding 102 by a filtering circuit consisting of resistor 1021 and capacitor 1022 connected in parallel to the terminals of a circuit comprising in series, second secondary winding 102 and a rectifying diode 1020. The terminal of second winding 102, which is connected directly to resistor 1021 and to capacitor 1022, is also connected to output 1024 of static switch T12, an output which in the case of a MOS transistor consists of the source. Primary winding 100 of transformer N1 is connected, on the one hand, to supply voltage +V of the control circuit through an oscillator 6, a switch 5 and a diode 7, on the other hand, to the ground by a diode 14 and a circuit C1. This circuit C1 consists of a Schmitt trigger with Hall effect comprising a supply terminal 13, an output terminal 11 to the ground and output 12. In this circuit C1 a transistor 10 is mounted as open collector, so that the collector is connected to output terminal 12 while the emitter is grounded by output terminal 11. When the magnetic cam is opposite sensor C1, transistor 10 conducts and, consequently, grounds output 12. This type of circuit is marketed by SPRAGUE under reference number UGN 3013. Supply terminal 13 is connected to the ground by a capacitor 8, and to voltage +V by a diode 7. Switch 5 of the circuit of FIG. 1 can be, either a simple switch, or, as will be seen later, a static switch which can be controlled by an electronic circuit, according to a signal that varies as a function of the rotation speed of the motor. In this case, this switch 5 will make it possible, as will be seen later, to make an adjustment to the speed of the motor. Point A common to primary winding 100, transformer N1, and single oscillator 6, is also connected to three other primary windings, respectively 200, 300, 400 of respective transformers N2, N3, N4. These transformers N2, N3, N4 are associated with sensors C2, C3, C4 and with supply points V2, V3, V4 of the winding of the motor. Transformer N2 associated with sensor C2 is connected, on the one hand, to common point A, on the other hand, by a diode 24, to this sensor C2. First secondary winding 201 makes it possible to connect positive supply terminal +VM to supply point V2 of the winding of motor 9, through static switch T21. This static switch T21 is controlled by the signal furnished by secondary winding 201 of the transformer, through half-wave rectifier element 2010 and filtering circuit 2011, 2012. Second secondary winding 202 of transformer N2 makes it possible to control, through rectifying diode 2022 and filtering circuit 2021, 2022, the gate of MOS transistor T22, which will make it possible to connect source 2024 of this transistor connected to motor voltage supply terminal VM, of opposite polarity, to drain 2023. Drain 2023 of this MOS transistor T22 is connected to output point V1 of the motor winding opposite output point V2 associated with first secondary winding 201 of transformer N2. As can be understood from FIG. 1, point A is connected to transformer N3 in series with a diode 34 and a sensor C3 controls a static switch T31 assuring the supply of point V3 with positive polarity voltage +VM and second secondary winding 302 controls a second static switch T32 assuring the supply of opposite output point V4 with negative polarity voltage −VM. Also, a fourth transformer N4, connected in series with a diode 44 and a sensor C4 is connected to point A. First secondary winding 401 of this transformer N4 will make it possible to control static switch T41 which makes it possible to connect positive polarity voltage terminal +VM, to output point V4 of the winding of motor 9. Finally, second secondary winding 402 makes it possible to control static switch T42 which makes it possible to assure the connection of output point V3 with opposite polarity voltage supply terminal −VM.

In a variant of the circuit of FIG. 1, capacitors 1012, 1022, 2022, 2012, 3012, 3022, 4012, 4022 can be eliminated provided that the values of capacitors 94 and 94b connected respectively between points V1, V2 and V3, V4 are modified. These capacitors 94 and 94b having as their object to absorb the overvoltages appearing in the windings of the motor. When the static switches of the circuit consist of MOS transistors, the transformers N1, N2, N3 and N4 have a transformation ratio equal to 1. This circuit can be used in the case where the power of the motor requires it with static switches of the bipolar transistor type. In this case, the MOS transistors are replaced with bipolar transistors whose collector replaces the drain, the emitter the source and the base the gate. In the case of bipolar transistors, the transformers N1, N2, N3 and N4 are voltage reducers and, consequently, have a transformation ratio equal to 1/n. Oscillator 6 works at a very high frequency, which can be on the order of 500 kHz or 1 MHz.

Figures 2, 4:
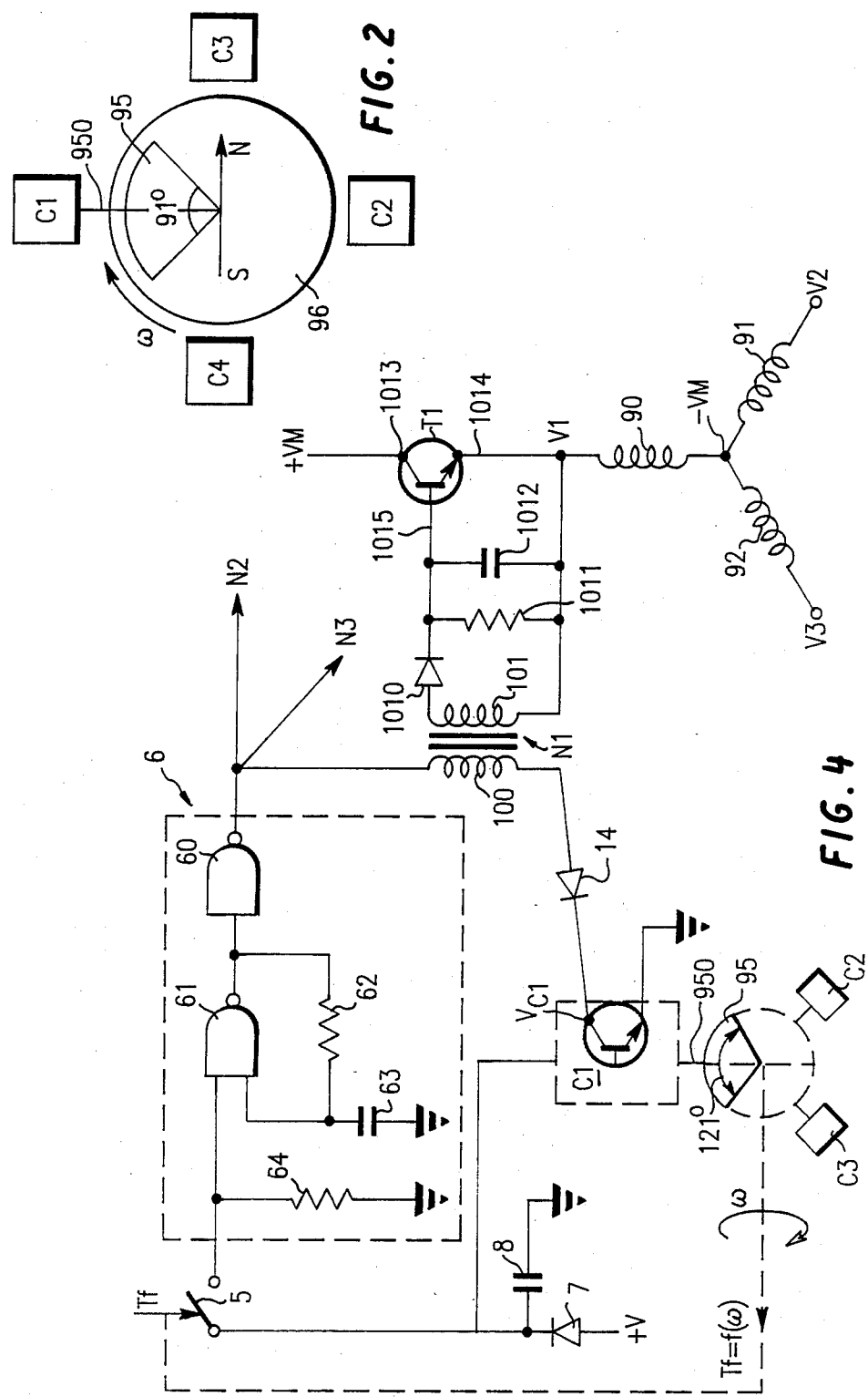
FIG. 2 represents the position of the exciting element in relation to the sensors and to the field crated by the inductive element of the rotor.
FIG. 4 represents an example of application of the switching control circuit to the switching of a star winding motor.

FIG. 2 represents the position of the exciting element 95 consisting of a magnetic cam forming an angular sector on the order of 91 degrees, to assure a slight covering between two sensors, in certain angular positions. Sensors C1 to C4 are distributed regularly on the periphery of the rotor at angles of 90 degrees. The axis of symmetry 950 of the exciting element 95, as can be seen in FIG. 2, is located perpendicular to the direction of the magnetic field created by rotor 96. The position of magnetic cam (95) on one side of the direction of the magnetic field created by rotor (96) makes it possible to assure the rotation of the motor in a certain direction, while the reverse of this position, in relation to the direction of the magnetic field represented by northsouth arrow 96, makes it possible to reverse the direction of rotation. In this case, the starting position of the cam would be opposite sensor C2. In the case where the cam is in the position represented in figure 2, sensor C1 is excited and, consequently, the primary winding of transformer N1 is grounded. Since switch 5 is closed, the oscillator is supplied and the signal of the oscillator is transmitted to secondary windings 101, 102 which will assure the switching of the static switches. This switching assures the passage of the current in the windings of motor 9 in the direction indicated by the arrows. The passage of the current will assure the rotation of the rotor in the direction indicated by arrow ω and when cam 95 is opposite sensor C3 points V3 and V4 of the winding will be connected to voltages +VM and −VM, respectively.

FIG. 3 represents the time diagram of the signals during a complete rotation of a turn of cam 95. Signal VC1 represents the voltage at output terminal 12 of sensor C1, signal VC3 represents the voltage at output terminal 32 of sensor C3. When signal VC1 is at level 0, signal VA, supplied by the output of oscillator 6, is transmitted through transformer N1 and assures, after rectifying and filtering, the switching of transistor T11 to transmit voltage +VM to terminal V1. Signal V1 represents the supply voltage of the motor. Signal V5 represents the voltage at the input terminal of the oscillator. This signal V5 consists of time peaks Tf, (Tf) being the closure time of switch 5, this closure time varies in a range going from a period of the signal of the oscillator to a period equal to the excitation period of a Hall effect sensor corresponding to an angle slightly greater than 90 degrees out of the 360 degrees of rotation of the rotor. Signal VA5 represents the output of the oscillator as a function of the inhibition represented by voltage V5. During the closure time of switch 5, the oscillator operates, which obtains at the terminals of the motor a signal represented by line V15. Since the oscillator no longer operates during the entire duration of passage of the cam in front of the sensor, the static switches, associated with each sensor, will transmit voltage VM only during a period less than the excitation period of a Hall effect sensor. Thus, the average supply voltage of the motor is between 0 and maximum value VM. The average supply voltage of the motor when the closure time of switch 5 is Tf is represented by curve V15, also for a closure time Tf1 of switch 5 that is longer than Tf, average supply voltage V35 between terminals V3 and V4 will be greater than voltage V15 and less than voltage VM. Therefore, it is understood that by causing times Tf to vary within the limits indicated, the supply voltage of the motor is caused to vary and, consequently, its speed of rotation. By acting on the closure time Tf, when switch 5 is a static switch, by means of an electronic circuit, so that Tf varies as a function of the variations of the speed of rotation of the motor, the speed of rotation is thus regulated. In the case where switch 5 is simply manual, by opening the circuit, the motor is stopped and by closing this switch, the motor is started.

FIG. 4 represents an embodiment of the switching circuit, applied to a star winding motor. This winding comprises three points 90, 91, 92, each connected to a common point, which is supplied by the negative pole of voltage source VM. In this application, the identical elements due to the circuit of figure 1, have the same references, It will be noted that transformers N1, N2, N3 here comprise a single secondary winding 101, or 201 and 301. The circuit associated with winding 101 consists of a rectifying diode 1010, a resistor (1011) and a capacitor 1012 constituting a filtering circuit and a bipolar transistor T1 whose emitter 1014 is connected to point V1 of winding 90, base 1015 is connected to the common point of the filtering and rectifying circuit and, collector 1013 is connected to the positive terminal of supply voltage VM. Since the motor comprises only three windings, associated with each of the windings is a sensor C1, or C2, C3, a transformer N1, N2, N3 and a transistor T1, T2, T3 with the associated circuit. These three sensors are distributed between one another on the periphery of the rotor, at angles of 120 degrees and are, in turn, excited by a magnetic cam 95 forming an angle of 121 degrees which makes it possible for this cam to excite, in certain position, two sensors at the same time. As before, the axis of symmetry 950 of this cam is located perpendicular to the axis representing the turning field of the rotor. If sensors making it possible to measure the speed of rotation of this axis are added to the axis of the rotor and an electronic circuit making it possible to control the closure of static switch 5 is added to these sensors for the times Tf such as $Tf = f(\omega)$, regulating the speed of the motor, thanks to this circuit (not shown), can be achieved. Oscillator 6 can be made in the form of a NAND gate 60 whose input receives the output of a NAND gate 61 with two inputs. The output of NAND gate 61 is connected by a resistor 62 to one of the inputs of gate 61, on the one hand, and, on the other hand, by a capacitor 63 to the ground. The second input of NAND gate 61 is connected, on the one hand to static switch 5 and, on the other hand, by a resistor 64 to the ground. When this static switch 5 is closed, i.e., in conduction state, the second input of NAND gate 61 is connected to voltage +V, which causes the oscillation of circuit 6. In the case where static switch 5 is open, i.e., in the blocked state, oscillator 6 is stopped. At the output of oscillator 6 are connected, as can be understood from FIG. 4, the three primary windings 100, 200, 300 of the respective transformers N1, N2, N3 whose other terminal is connected, by protective diodes 14, 24, 34 to Hall effect sensors C1, C2, C3. As has already been explained, diode 7 and capacitor 8 protect the circuit from the errors of connecting of polarity.

Other modifications within the scope of a man of the art are also part of the spirit of the invention. Thus, it is quite evident that Hall effect transistors C1, C2, C3 can optionally be replaced with optoelectronic sensors or any other sensor performing the same function.

We claim:

1. Circuit for controlling the switching of a brushless, direct current motor comprising an exciting element (95) solid in rotation with a turning element of the motor, this exciting element working with stationary sensor (C1), (C2), (C3) in a number equal to the number of windings (90), (91), (92) of the motor, said stationary sensors are evenly distributed around the drive shaft on the periphery of a stationary element of the motor and located along predetermined angular sectors, so that the exciting element (95) passes successively in the immediate vicinity of each of the sensors, these sensors (C1), (C2), (C3) being normally in a state of high impedance and passing to a state of low impedance when the exciting element, in its movement of rotation, passes in the immediate vicinity of the sensor, wherein the exciting element covers an angular sector near the angular sector defining the successive space of two sensors (C1), (C2), (C3), each sensor (C1), (C2), (C3) is mounted in a circuit comprising in series a common single oscillator (6) and the primary winding (100), (200), (300) of a respective transformer (N1, N2, N3) and the associated sensor (C1), (C2), (C3), said respective transformer (N1) comprising at least one secondary winding (101), one terminal of the secondary winding is connected, by a half-wave rectifier circuit (1010) and a filtering circuit (1011), (1012), to the control input of a static switch (T1) assuring the transmission of the supply voltage (VM) to the winding (90) of the motor.

2. Circuit according to claim 1, wherein there are three windings in the motor, the windings are connected in a star configuration.

3. Circuit according to claim 2, wherein the exciting element (95) covers an angular sector slightly greater than 120 degrees, so as to be able to excite simultaneously two of the three sensors (C1), (C2), (C3) associated with the star configuration windings having three terminals.

4. Circuit for controlling the switching of a brushless, direct current motor comprising an exciting element solid in rotation with a turning element of the motor, this exciting element working with stationary sensors in a number equal to the number of windings of the motor, said stationary sensors are evenly distributed around the drive shaft on the periphery of a stationary element of the motor and located along predetermined angular sectors, so that the exciting element passes successively in the immediate vicinity of each of the sensors, these sensors being normally in a state of high impedance and passing to a state of low impedance when the exciting element, in its movement of rotation, passes in the immediate vicinity of the sensor, wherein the exciting element covers an angular sector near the angular sector defining the successive space of two sensors, each sensor is mounted in a circuit comprising in series a common single oscillator and the primary winding of a respective transformer associated with each sensor; wherein each said respective transformer comprises two secondary windings whose outputs are connected by a half-wave rectifier circuit and a filtering circuit has respectively a first static switch connecting symmetrically one half of the winding of the motor to the positive polarity of a supply voltage and a second static switch connecting the other half of the winding of the motor to the negative polarity of the supply voltage of the motor.

5. Circuit according to claim 4, wherein the windings of the motor are four and connected in series with four output points (V1), (V2), (V3), (V4), the exciting element (95) covers an angular sector slightly greater than 90 degrees, so as to be able to excite in certain angular positions, simultaneously two of the four sensors (C1), (C2), (C3), (C4) associated with each of the windings.

6. Circuit according to one of claims 3 or 5, wherein the static switch consists of a MOS transistor and the transformer has a transformation ratio equal to 1.

7. Circuit according to one of claims 3 or 5, wherein the static switch consists of a bipolar transistor and the transformer has a transformation ratio equal to 1/n.

8. Circuit according to claim 1 or 4, wherein the operation of the oscillator is inhibited by a switch whose open position controls the stopping of the motor and the closed position controls the starting of the motor.

9. Circuit according to claim 1 or 4, wherein the operation of the oscillator is inhibited by a static switch whose closure time is determined by an electronic circuit controlled as a function of the speed of rotation of the motor.

* * * * *